No. 744,810.

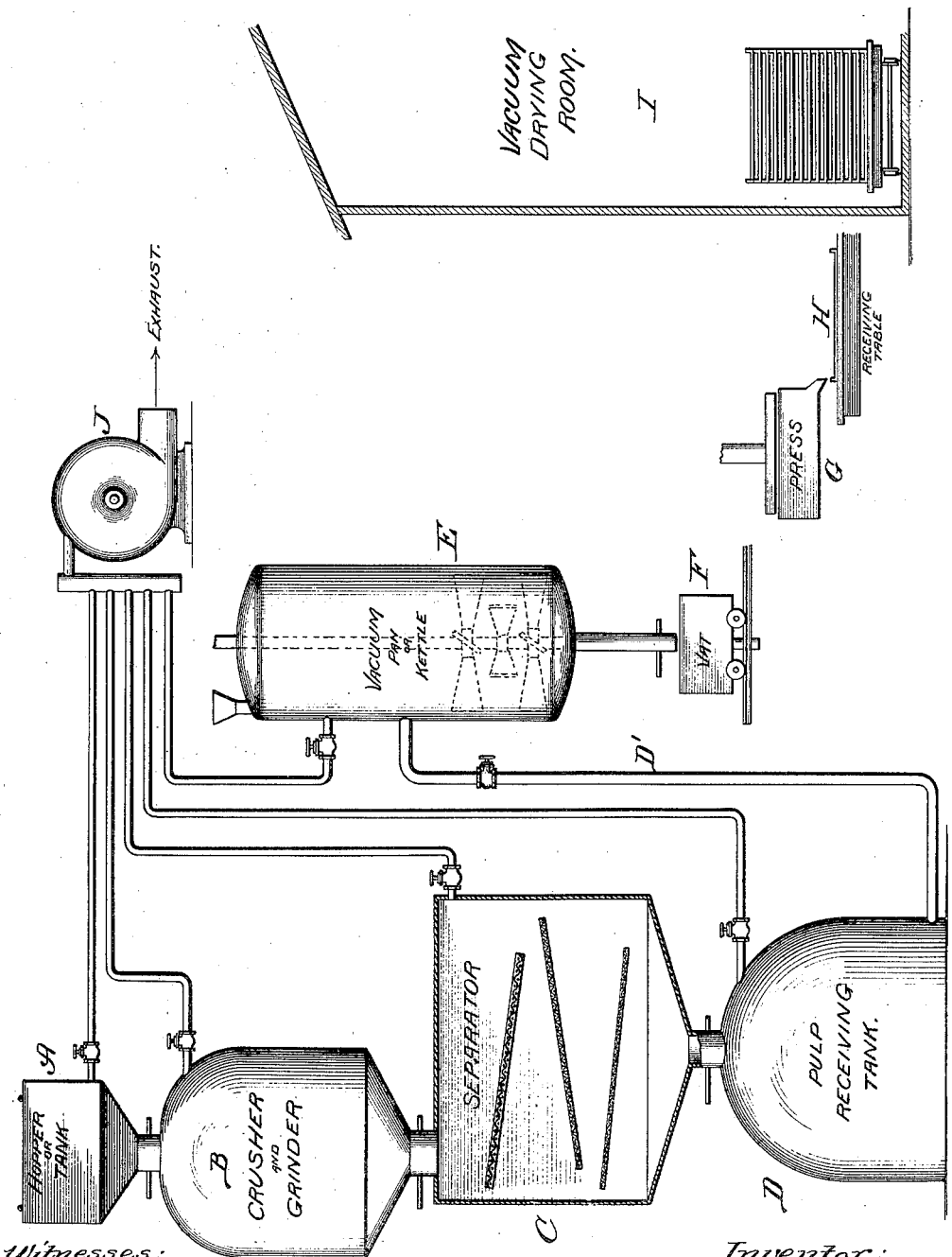

Patented November 24, 1903.

UNITED STATES PATENT OFFICE.

DANIEL F. SHERMAN, OF CHICAGO, ILLINOIS, ASSIGNOR, BY DIRECT AND MESNE ASSIGNMENTS, TO CALIFORNIA CONCENTRATED FRUIT COMPANY, A CORPORATION OF CALIFORNIA.

PROCESS OF PRESERVING FRUIT.

SPECIFICATION forming part of Letters Patent No. 744,810, dated November 24, 1903.

Application filed September 20, 1901. Serial No. 75,925. (No specimens.)

*To all whom it may concern:*

Be it known that I, DANIEL F. SHERMAN, a citizen of the United States, residing at Chicago, in the county of Cook and State of Illinois, have invented certain new and useful Improvements in Processes of Preserving Fruit, of which the following is a specification.

The object of the process of the present invention is to preserve fruit under conditions and environments by which the resultant product will have and retain therein the colors, flavors, and natural properties to a large extent of fresh fruit and which is adapted for making pies, sauces, jams, and other purposes for which fresh fruit is employed and for the use of manufacturers, confectioners, housekeepers, and others who desire an article of preserved fruit that can be used and have the qualities of fresh fruit when cooked and which can be utilized with practically the same results as cooked fresh fruit.

The process employs in the several steps or stages thereof the treatment of the fruit *in vacuo*, and the steps of the process are washing the fruit, then reducing the fruit to a mash or mastic condition by grinding or otherwise, then separating the finer pulp from the coarser portion, then cooking and concentrating the pulp to a plastic condition in the form of a thick pasty resultant, and then drying the resultant for the finished product, and the fruit, if necessary so to do, at some stage of the treatment can be subjected to the action of harmless agents which will prevent decolorization. The final product will be of a nature and condition to maintain its structural formation without deterioration or ill effects from atmospheric conditions and changes and to have and retain therein the color, flavor, and other properties of the fruit, and this without having the finished product dry and hard, though in a solidified condition, compact and coherent, readily dissolvable and digestible, and of a character not to absorb atmospheric moisture to a sufficient extent to cause injurious effects.

The treatment of fruits generally under the process is as follows: The fruit is first thoroughly washed to remove all foreign substances and impurities, and after washing the fruit is subjected to a mashing treatment by which it is reduced to a mash or mastic condition having therein the juice, the finer pulp, and the coarser fiber or portions of the fruit. The mash or mastic is deposited in a separator or other suitable machine, preferably a sieve or screen, by means of which the pulp of the fruit is separated from the coarser portions, such as the skins, the coarser fibers, the hulls, and stems. The separated pulp and juice is transferred to and deposited in a receptacle connected with the separator, and from this receptacle the pulp (by which is meant the solids and juices of the fruit) is drawn or siphoned into a vacuum pan or kettle for reduction therein to a thick pasty condition. The vacuum pan or kettle can be of any ordinary and well-known form of construction and preferably has therein an agitator or stirrer by means of which the material delivered into the pan or kettle can be thoroughly stirred. The pan or kettle is first brought to a condition of *vacuo* sufficient for drawing thereinto the pulp, and when the pulp is drawn into the pan or kettle to the height required or the height which may be deemed advisable the admission of pulp thereinto is shut off and steam or other heating means is applied to the pan or kettle with the agitator in operation, and under these conditions the material in the pan or kettle is cooked and concentrated to eliminate moisture therefrom. The temperature under which the treatment in the vacuum pan or kettle is carried on should not reach 200° Fahrenheit, though the vacuum in the kettle should be maintained as high as possible all the time in order to retain the color, flavor, and natural properties of the fresh fruit and to save time in bringing the material to the proper pasty condition, as a high temperature will destroy the color and disperse the flavors and a low temperature will require too much time for the operation. The treatment up to this point should have all of the steps preferably *in vacuo*—that is, the masher, the separator, the receiving-tank, and the pan or kettle should be under a condition of *vacuo* in operating on the fruit.

The pulp is subjected to a treatment in the vacuum-pan to retain therein the original and natural flavors and properties of the fruit under the following conditions: The vacuum-pump is first started, and when the gage registers fifteen points, approximately, the pulp is drawn into the vacuum pan or kettle by suction, care being taken not to allow the vacuum to fall below ten points, and in the event of a lower point than ten being registered the infilling of the pulp is to be made less rapidly. The agitator of the vacuum pan or kettle is to be started when the vacuum-gage registers eighteen points, and when this stage is reached the steam should also be turned on or admitted to the vacuum-pan. The vacuum-gage during the operation of agitating the material under the heat of the steam should not be allowed to fall below eighteen points and should be maintained, approximately, at twenty points until the mashed pulp in the pan or kettle begins to thicken, and when the required thickening or reduction to a plastic condition is reached the action of the steam need not proceed further, as the resultant is then ready to be drawn off from the vacuum pan or kettle. During the treatment of the mashed material within the vacuum pan or kettle the thermometer will gradually rise from a temperature of 140° to 180° Fahrenheit, and preferably the temperature during the treatment within the vacuum pan or kettle should be a medium one of approximately 160°, at which point, or between the temperatures of 140° to 180° Fahrenheit, the mass begins to thicken, and with the further proceeding of concentrating or thickening the vacuum gradually rises to twenty-six and one-fourth, and the thermometer falls to about 135° Fahrenheit, and when these two conditions of vacuum and temperature are reached the product is brought to a condition for removal from the pan, so as to be in a solidified, coherent, and compact plastic condition, so that when removed and submitted to a final drying the moisture will be eliminated to a point below that at which fermentation would take place, rendering the product fermentation proof, both as to organized or yeast ferments and unorganized or chemical ferments, the latter of which, with fresh fruit, in the event of injury of the cells or exposure of the fruit to the air will in a very short time oxidize and modify the color, flavor, and aroma of the fruit.

The cooking and concentrating treatment of the pulped material to eliminate moisture should be continued until the material is reduced to a thick pasty condition, and preferably the fruit is treated in its natural state and without the use of sugar, syrup, glucose, or other sweetening or a binder of any character, though a little sweetening of some suitable kind may be employed. The paste is discharged from the vacuum pan or kettle into a receiver or tank, which, if desired, can also be in a vacuum condition, and from the receiver or tank the paste or resultant of the treatment in the vacuum pan or kettle can be discharged into a suitable press, by which it will be formed into any desired shape, or run into trays or into molds of various sizes and shapes or run into the form of thin slabs or sheets, after which in whatever form the product is finally left it is to be thoroughly dried without becoming hard, and such drying is preferably in a drying-room; but an evaporating-pan or other drying means may be used, or the product may be dried naturally in the sun. If dried in a drying-room or evaporator, it is preferred to have the drying *in vacuo*, so that, with the slight intermission of forming the product from the vacuum pan or kettle into a shape and entering the same into the drier, the entire process, as to the steps thereof, from the point of admission into the grinder or crusher until withdrawal from the drying-room is conducted *in vacuo*, and as a result the finished product will have and retain therein the color, flavor, and natural properties of the fresh fruit.

In the treatment of fruits having stems and cores the stems and cores can be removed, if so desired, before mashing, and in the treatment of fruits having pits the pits can be removed by hand or otherwise before mashing; but with cored or pitted fruits the removal of the cores or the pits could take place in the separator or pulper, which for this purpose should be provided with a coarse sieve or screen to separate the pits and very coarse material, a second finer sieve to separate the skins, stems, and coarser portions, and a still finer sieve or screen for the pulp proper. The skins and coarser fibrous portions of the fruit can be treated in the vacuum pan or kettle under the same condition as the finer pulp, making a resultant which can be used as a product for various purposes.

The resultant from the vacuum pan or kettle can be run into trays, and the trays, if desired, can be sprinkled on the bottom with corn-starch or any suitable material, or the bottom of the trays may have spread thereover cotton cloth, paper, or other suitable material, cotton cloth being preferred, and this treatment of the trays is for the purpose of preventing the materials from sticking to the bottom and interfering with the removal thereof for drying or other disposition. The trays can be of a formation to leave air-spaces between them when stacked one on top of the other to facilitate the drying operation in the drying-room or other drier, and when dried the finished product will be of a nature not to ferment in keeping and will have sufficient tenacity and coherence to support itself and be handled without being easily broken.

The finished product when sufficiently dried is taken from the drying place and packed in boxes or cases, preferably having an inside slightly larger than the size of the finished product, and in packing after the first piece is placed in the box or case thin cloth or other suitable material is laid thereover, and the succeeding pieces of the finished product are placed one on another with cloth or other suitable material between, so that each individual piece of the finished product has cloth both above and below, which will prevent the product from sticking together and also assist in keeping the product clean. The interposed cloth, however, is not necessary with all kinds of fruit, and paper or other material may be used in place of cloth; but cloth is preferred, as it is readily removed by pouring hot water thereover when the product is to be used. The packing of the product, in conjunction with the process by which it is made, protects the product from insects and is a perfect safeguard against the product becoming wormy or otherwise spoiled or affected by atmospheric influences and climatic changes.

Among some of the advantages pertaining to this process for preserving fruit may be mentioned the following: The process can be utilized with fruit with or without the addition of sugar, glucose, syrup, or a sweetening agent. The fruit is kept from oxidation and is operated upon in its healthy condition. None of the flavor of the fruit is lost and the color remains. The resultant product is solidified and coherent. It is capable of long preservation. It does not deteriorate in keeping. It dispenses with the use of cans, jars, or other similar receptacles. It is easily handled. It is in a compact shape and the best condition possible for shipment. The cost of transportation is reduced. Less storage-space is required, and the process is carried on and the final product is produced at a great saving of labor and time as compared with other methods or processes of putting up and preserving fruit.

The entire process is preferably conducted *in vacuo;* but it is desirable to have the process one by which a vacuum can be produced or not at each stage thereof—that is, so that one stage can have the vacuum broken for examination of the material or otherwise, while the other steps or stages remain in a condition of vacuum to prevent oxidation or decolorization and to assure the final product having and retaining therein the color, flavor, and natural properties of the fresh fruit from which the product is made.

In the treatment of berries and of very ripe fruit under the process of this invention the mashing step can be dispensed with and the berries and ripe fruit can be first operated upon in the separator or pulper after being washed, if so desired, and when reduced to a pulpy condition the mash or mastic is to be drawn into the vacuum pan or kettle and there subjected to treatment, as hereinbefore described, for reduction to a plastic, solidified, and coherent resultant. It is also possible with berries and very ripe fruit after washing and removing the stems and hulls and stems and cores and skins if it is desired to not treat the skins of ripe fruit to operate directly on the berries and ripe fruit in the vacuum pan or kettle without previous treatment to bring the fruit into a mash or mastic and a pulp, as the treatment in the vacuum pan or kettle will bring the fruit to a pulp for the continued treatment to form the resultant, as already described.

An apparatus suitable for the purpose of carrying out the steps of the process is illustrated in the drawing, in which the figure is an elevation, in outline principally, showing an arrangement of hopper or receiving-tank, grinder, crusher or masher, separator or pulper, and vacuum pan or kettle, all arranged in coacting relation and subject to a vacuum, and the figure also shows a receiver or receptacle for the resultant from the vacuum pan or kettle, a press for shaping the finished product, trays for the product, and a drying-room.

The fruit can be deposited in the hopper or tank A by hand or by means of a suitable elevator or conveyer, and this hopper or tank has its covers arranged so as to be air-tight for creating a vacuum in the hopper or tank. The hopper or tank is located in such relation to a grinder, crusher, or masher B as to discharge the fruit from the hopper or tank into the grinder, crusher, or masher, and the grinder, crusher, or masher is arranged in such relation to a separator or pulper as to discharge the mash or mastic therefrom into the separator or pulper. The separator or pulper C in the arrangement shown has therein an upper coarse sieve for operating on the pits and very coarse portions of the fruit, an intermediate sieve for operating on the coarse fibers, and a lower sieve for operating on the fine pulp which is to be treated for the product. The separator or pulper is located to discharge the pulp of the fruit into a receiving-tank D, and this tank is connected by a pipe D', having therein a controlling-valve with a vacuum pan or kettle E, into which the pulp is drawn for treatment. The vacuum pan or kettle may be of any suitable and well-known form of construction, and preferably has therein a beater, stirrer, or agitator and is provided with a manhole for admission to the interior. The resultant of the fruit derived from the treatment in the vacuum pan or kettle is discharged into a receiver or vat F, which may be mounted on wheels, if so desired, so as to be readily moved from place to place, and from this vat the resultant is discharged into a suitable press G, having a spout of suitable shape to form the resultant into bricks, blocks, cubes, slabs, sheets, or other shape and deposit the same into a tray H on a receiving-table properly located for the resultant to be deposited in the tray. The trays when full and having the material of the shape desired are loaded on a truck or other conveyance and run into a drying-room I, which preferably is in vacuum, where the finished product is treated, so as to be in a condition for handling, as described.

The various appliances which enter into the construction of the apparatus as a whole, from the hopper or tank into which the fruit is first deposited to the vacuum pan or kettle, are each connected by its own pipe with an exhaust-fan or vacuum-pump J, so that all of the appliances can be brought into a condition of vacuum or any one of the appliances can be in a condition of *vacuo*, for which purpose the several pipes between the respective appliances and the vacuum pan or kettle are each provided with a shut-off valve. The fruit if treated with sugar, glucose, syrup, or other sweetening or with any form of binder can be best treated in the vacuum pan or kettle, and if treated with a sweetening, such as sugar or a binder, the treatment preferably should be prior to the application of heat to the vacuum pan or kettle for the production of the resultant.

The treatment *in vacuo* from start to finish will of itself retain the color of the fruit whether pulped or whole or divided; but with an omission or failure to treat at one step of the process *in vacuo*, which might cause decolorization, or in the event it is desired to bleach the fruit, a harmless agent against decolorization or for bleaching can be employed at some step or stage of the process, such agent being in the form of a suitable chemical in solution or the fumes of such chemical which will not affect the product and which will be harmless to the consumer.

What I regard as new, and desire to secure by Letters Patent, is—

1. The process of preserving fruit, which consists in reducing under *vacuo* the fruit to a pulp having the solids of the juice retained therein, and then subjecting the juice and pulp to a concentrating cooking treatment also under *vacuo*, substantially as described.

2. The process of preserving fruit, which consists in reducing under *vacuo* the fruit to a pulp having the solids of the juice retained therein and adding a binder thereto, then subjecting the juice and pulp and binder to a concentrating cooking treatment also *in vacuo*, substantially as described.

3. The process of preserving fruit, which consists in first mashing the fruit *in vacuo* and reducing the same to a pulped condition with the juice retained therein, separating *in vacuo* the finer pulp from the coarser material and then subjecting the separated pulp with the solids of the juice therein to a concentrating cooking treatment also *in vacuo*, substantially as described.

4. The process of preserving fruit *in vacuo*, which consists in first mashing the fruit *in vacuo* and reducing the same to a pulped condition with the juice retained therein, separating the finer pulp from the coarser material, then subjecting the separated pulp with the solids of the juice therein to a concentrating cooking treatment also *in vacuo*, and finally drying the product, substantially as described.

5. The process of preserving fruit, which consists in reducing under *vacuo* the fruit to a pulp having the solids of the juice retained therein, then subjecting the solids of the juice and the pulp to a concentrating cooking also under *vacuo*, and finally drying the product, substantially as described.

DANIEL F. SHERMAN.

Witnesses:
OSCAR W. BOND,
THOMAS B. MCGREGOR.